United States Patent [19]

Chromy et al.

[11] 3,915,430

[45] Oct. 28, 1975

[54] ANTI-SLIP MEANS FOR A VEHICLE RAMP

[76] Inventors: Ben J. Chromy, 14590 Horseshoe Drive, Saratoga, Calif. 95070; Gerald L. Moore, 1185 Old Oak Drive, San Jose, Calif. 95120

[22] Filed: Jan. 17, 1975

[21] Appl. No.: 542,064

[52] U.S. Cl. .................................................. 254/88
[51] Int. Cl.² ........................................... E02C 3/00
[58] Field of Search ..................................... 254/88

[56] References Cited
UNITED STATES PATENTS

| | | | |
|---|---|---|---|
| 1,791,986 | 2/1931 | Vehon | 254/88 |
| 1,871,129 | 8/1932 | Pierce | 254/88 |
| 1,922,555 | 8/1933 | McCosh | 254/88 |
| 3,178,156 | 4/1965 | Rigters | 254/88 |

*Primary Examiner*—Othell M. Simpson
*Attorney, Agent, or Firm*—Gerald L. Moore

[57] ABSTRACT

A holding means on a portable vehicle ramp for increasing the frictional engagement between the ramp and ground for preventing the ramp from sliding along the ground as the vehicle wheel rides up the ramp.

4 Claims, 3 Drawing Figures

U.S. Patent Oct. 28, 1975 3,915,430
FIG. 2
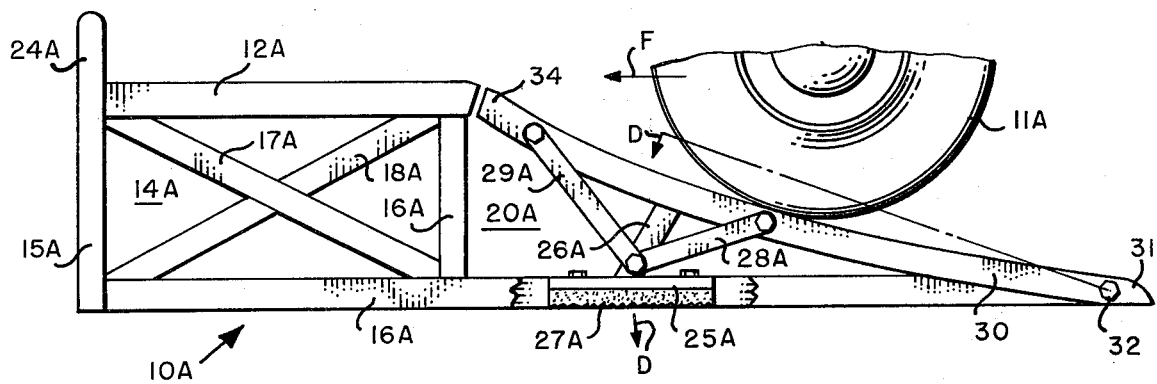
FIG. 1
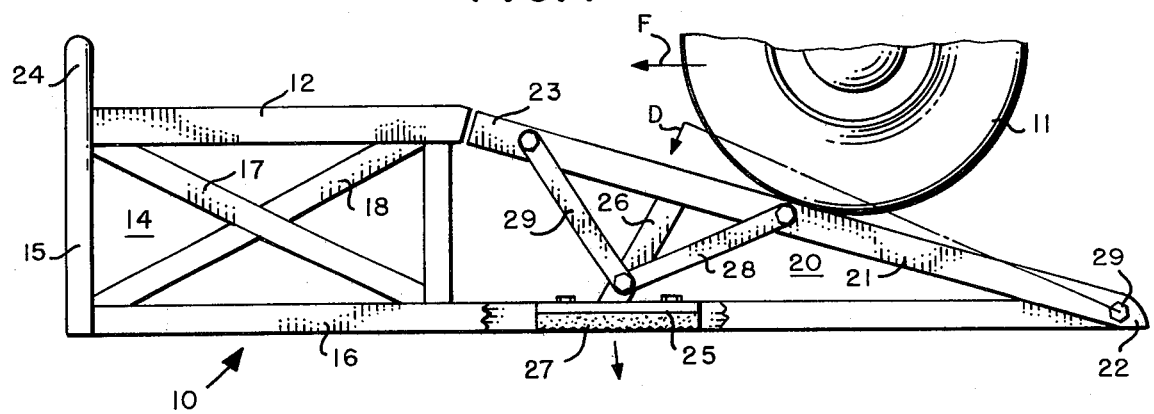
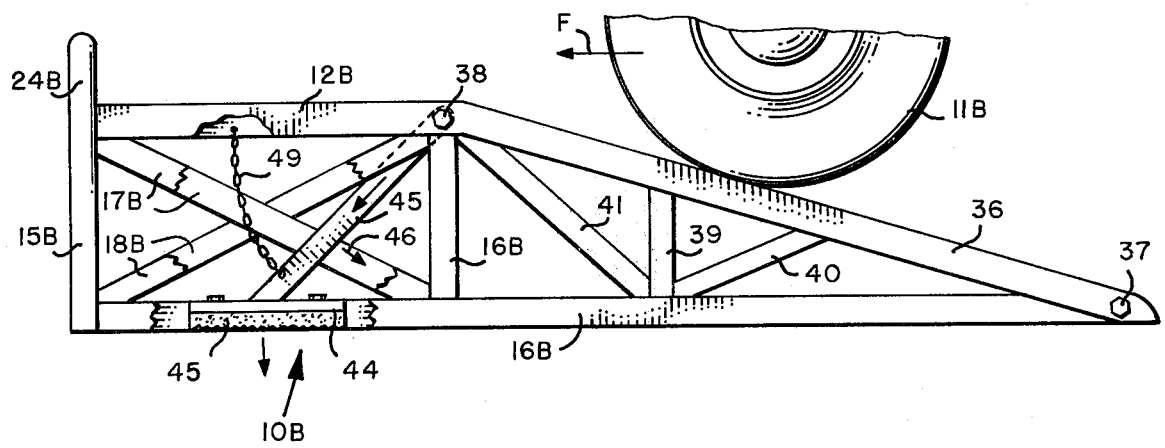
FIG. 3

ANTI-SLIP MEANS FOR A VEHICLE RAMP

BACKGROUND OF THE INVENTION

Portable vehicle ramps are widely used today primarily for the purpose of enabling the vehicle owner to quickly and easily raise one or more wheels of a vehicle for easier access to the vehicle's underside. Normally such ramps are used in the owner's garage or driveway for the purpose of performing routine maintenance or repairing the vehicle. Usually the ramps are used in pairs such that either both or front or rear wheels of a four-wheeled vehicle are driven onto the ramp in unison.

However, attempts to use the present ramps has led to problems as the vehicle is being driven onto the ramp. It has been found that the ramp tends to slide in the direction the vehicle is being driven instead of remaining stationary so that the vehicle wheels will ride up the inclined ramp surface prior to coming to rest on the horizontal surface section. Previous attempts have been made to make the underside of the feet for the ramp more resistant to sliding, however, the forces involved during the initial encounter between each ramp and the associated wheels dictates that such devices can only be minimally successful. Accordingly it is the object of this invention to provide an improved method for holding a ramp stationary while the wheel of a multi-wheeled vehicle is being driven thereupon.

DESCRIPTION OF THE DRAWING

FIG. 1 is a first embodiment of the invention showing the vehicle wheel halfway up the ramp. FIG. 2 is a second embodiment of the invention and FIG. 3 is a third embodiment of the invention.

SUMMARY OF THE INVENTION

A vehicle ramp upon which one wheel of a vehicle can be driven for raising the vehicle above normal ground level, comprising a platform section having a substantially horizontal top surface upon which the vehicle wheel rests in the elevated position and a ramp section including an inclined ramp member with one end at ground level and the other end adjacent the horizontal top surface of the platform section and including a foot pad connected to the ramp by a force-transmitting member extending generally in the direction of the resultant of the forces imposed on the ramp as the vehicle is being driven thereupon such that these forces are directly transmitted to the foot pad for increasing the engagement with the ground to resist slippage by the ramp along the ground.

DESCRIPTION OF THE INVENTION

In FIG. 1 is shown a typical application of the subject invention embodied in a portable ramp 10 upon which one wheel 11 of a multi-wheeled vehicle or automobile (not shown) is being driven. In this instance the vehicle is being driven from right to left such that the wheel can come to rest on the top surface member 12 of the platform section 14. This platform section comprises a plurality of upright members 15 and 16 extending generally vertically from the corners of the top surface member to the ground. The upright members are connected at the bottom by a horizontal member 16 resting against the ground and by diagonal braces 17 and 18 extending from the top portion of one upright to the bottom portion of the adjacent upright. All of these bracing members can be fixed together either by bolting or welding as desired.

The portable ramp also is provided with the ramp section 20 which includes an inclined ramp member 21 having one end 22 resting on the ground and the other end 23 terminating adjacent and at the same level as the top surface member 12 of the platform section. Thus the wheel of the vehicle is driven upon the portable ramp by first rolling upon the lower end of the ramp member, rolling up the ramp and thereafter coming to rest on the top member 12. A stop 24 is provided at the end of the platform section opposite the ramp for preventing the wheel from rolling on off the end of the ramp.

However, as mentioned before, when the vehicle wheel first is driven onto the ramp the resultant forces impressed upon the ramp comprise a downward force D due to the weight of the vehicle on that wheel and a relatively large force F extending in the direction the vehicle is being driven. This forward force results from the resistance of the vehicle to rise as it is being driven forward up the inclined ramp section of the ramp. It is thought that the resultant force of these two forces changes as the relative position of the wheel and ramp change. For instance as the wheel first enters the ramp very little downward force is pressed upon the lower end of the ramp section but a significant forward force is exerted tending to push the ramp along the ground. Thereafter as the wheel rolls up the ramp, the forces tend to stabilize with the weight of the vehicle becoming more significant relative to the forward force until finally the forward force is somewhat insignificant when the wheel rolls onto the flat horizontal top surface of the platform section. Thus to prevent the ramp from slipping along the ground as the wheel is being driven up the ramp section, the present invention intends to make use of the forward force to increase the frictional engagement between the ramp and the ground.

In accordance with one aspect of the invention there is provided on the ramp 10 a foot pad 25 fixed to the end of one or more elongated rigid members 26 extending up to the ramp member 21. The bottom 27 of the pad member is adapted to increase the frictional engagement between the pad member and the ground to resist slipping thereon. Braces 28 and 29 extending between each elongated member 26 and the ramp member 21 are provided to rigidly fix these elongated members 26 to the ramp member.

The ramp member itself is fixed to the bottom brace 16 on each side of the ramp by a bot 29 extending through those braces and the ramp member such that the ramp member can pivot about the bolt since the upper end 23 is not fixed to the platform section of the ramp assembly. Therefore as the wheel rolls upon the ramp section and a forward force indicated by the arrow F is exerted on the ramp, this force is transmitted directly through the elongated member 26 to the pad 25. Very little force otherwise is transmitted through the ramp assembly to the ground. Because of the direction in which the elongated member 26 extends, it efficiently transmits the resultant force of both of these forward and downward forces exerted by the vehicle wheel. If the ramp tends to slip in the forward direction, i.e., from right to left, the frictional engagement of the pad with the ground will tend to slightly pivot the ramp about the bolt 29 thereby tending to increase the effect of the forces resisting slippage between the pad and the ground. Thus slippage of the ramp along the ground will be resisted much more effectively than if such forces were merely transmitted through a plurality of stationary feet on the ramp assembly to the ground as in present-day portable ramps. Of course the bottom of the pad can also have fixed thereto either a rubber material or metal cleats depending upon the surface (i.e., the ground or garage floor) on which the ramp is to be used. Such choice is independent of the operation of the invention.

In FIG. 2 is shown a second embodiment of the invention with those parts of the ramp assembly numbered the same (but with the suffix "A") functioning in the same manner as the components of the same suffix described in FIG. 1. However, the primary difference between the embodiments is the configuration of the inclined ramp member. Wherein in FIG. 1 the ramp 21 is of a planar configuration the ramp 30 of FIG. 2 is instead of a concave configuration. The end 31 adjacent to the floor is fixed by a bolt 32 to the bottom member 16A as in FIG. 1. Similarly the end 34 of the ramp is adjacent but not fixed to the horizontal member 12A as in FIG. 1. However, the ramp itself is of a concave configuration with the end adjacent the ground extending at a lesser angle with the horizontal or ground than the end adjacent the top surface member for the purpose to be described hereinafter.

It has been found that the forward force F exerted by the tire on the ramp is proportional to the inclination of the ramp relative to the ground on which the ramp and the vehicle rest. Therefore, by making the ramp in the concave configuration shown, the force F tending to cause the ramp to slip along the ground is reduced during the early stages of vehicle entry onto the ramp until such time as the weight of the vehicle on that wheel squarely rests on the ramp. At that time this weight is transferred between the member 26A to the pad 25A thereby firmly resisting forward slippage of the ramp. Thereafter the inclination of the ramp member is increased to raise the vehicle to the level of the member 12A without slippage of the ramp member.

In FIG. 3 is shown still another embodiment of the invention, with those members of the same suffix as shown in FIG. 1 functioning in exactly the same manner. However, in this embodiment the ramp 36 is fixed by a bolt 37 firmly to the base member 16B and also by the bolt 38 to the upright 16B and the horizontal member 12B. For support of the ramp there is provided additionally the vertical upright 39 and the braces 40 and 41 extending between portions of the ramp member and the bottom member 16B.

In accordance with this embodiment of the invention there is also provided a pad 44 which is fixed to one or more longitudinal members 45 pivotally held by the bolt 38. Thus as the tire enters upon the ramp, the force F tends to push the ramp in the direction of the arrow, however, such movement of the ramp is resisted by the frictional material 45 on the bottom of the pad 44 as the pad pivots with the member 45 about the bolt 38 in the direction indicated by the arrow 46. Such pivoting movement tends to transfer the weight of the vehicle and a portion of the forward force F through the member 45 and the pad 44 to increase the force between the pad and the ground to directly resist forward slippage of the ramp assembly. A chain 49 prevents pivoting of the member 45 sufficiently for the pad not to extend parallel to the ground.

The invention claims:

1. A vehicle ramp upon which one wheel of a vehicle can be driven for raising the body of the vehicle above normal ground level, comprising:

a platform section having a substantially horizontal top surface member on which the vehicle wheel rests, said surface member being supported on uprights extending to ground level, said uprights being sufficiently strong to support the wheel and associated weight of the vehicle;

a ramp section having a ramp member with one end at ground level and the other end extending at an angle to the ground to the height of and adjacent to the platform surface member whereby the vehicle wheel can be driven onto the one end of the ramp and up the ramp onto the top surface member;

a foot pad having a bottom surface adapted to engage the ground and resist slipping along the ground;

means extending downward and in the direction of movement of the wheel and the foot pad for transmitting the force resulting from the vehicle wheel rolling upon the ramp section directly to the foot pad thereby pressing downward on the pad to anchor the vehicle ramp against sliding movement in the direction the vehicle is being driven upon mounting the ramp.

2. A vehicle ramp as defined in claim 1 wherein said means extending downward and connecting with the foot pad comprises an elongated member having the end opposite the end fixed to the foot pad pivotally connected to the ramp.

3. A vehicle ramp as defined in claim 1 wherein the means connecting the ramp is rigidly fixed to the ramp member and the ramp member is pivotally fixed only at its lower end to the platform section.

4. A vehicle ramp as defined in claim 3 wherein the ramp member is concave shaped such that the end adjacent to the ground is at a lesser angle to the horizontal than the end adjacent to the top surface member.

* * * * *